United States Patent

Hara et al.

[11] Patent Number: 5,424,020
[45] Date of Patent: * Jun. 13, 1995

[54] METHOD FOR PRODUCING MOLDED ARTICLE OF FIBER-REINFORCED THERMOPLASTIC RESIN

[75] Inventors: Takahisa Hara; Masahito Matsumoto; Nobuhiro Usui; Shigeyoshi Matubara, all of Osaka, Japan

[73] Assignee: Sumitomo Chemical Company, Limited, Osaka, Japan

[*] Notice: The portion of the term of this patent subsequent to Jan. 4, 2011 has been disclaimed.

[21] Appl. No.: 80,119

[22] Filed: Jun. 23, 1993

Related U.S. Application Data

[63] Continuation of Ser. No. 684,912, Apr. 19, 1991, Pat. No. 5,275,776.

[30] Foreign Application Priority Data

Aug. 21, 1989 [JP] Japan ................................. 1-215434
Mar. 9, 1990 [JP] Japan ................................. 2-59428

[51] Int. Cl.6 ................................................. B27N 3/04
[52] U.S. Cl. ...................................... 264/257; 264/258; 264/328.16; 264/328.18; 264/328.19
[58] Field of Search ............... 264/257, 258, 261, 263, 264/328.16, 328.18, 328.19, 211.21, 211.23, 211.22; 425/208

[56] References Cited

U.S. PATENT DOCUMENTS

| | | | |
|---|---|---|---|
| 2,797,179 | 6/1957 | Reynolds et al. | 264/163 |
| 3,248,467 | 4/1966 | Gehr et al. | 264/259 |
| 3,776,989 | 12/1973 | Annis, Jr. et al. | 264/328.19 X |
| 4,340,551 | 7/1982 | Wada et al. | 264/328.16 X |
| 4,340,562 | 7/1982 | Gross et al. | 264/328.18 X |
| 4,379,103 | 4/1983 | Doerfling | 264/45.5 |
| 4,556,529 | 12/1985 | Muser et al. | 264/263 |
| 4,927,579 | 5/1990 | Moore | 264/328.18 X |
| 4,933,131 | 6/1990 | Okey et al. | 264/331.21 |
| 5,106,564 | 4/1992 | Iwanami et al. | 425/208 X |

FOREIGN PATENT DOCUMENTS

| | | |
|---|---|---|
| 0333198 | 9/1989 | European Pat. Off. . |
| 1357270 | 2/1964 | France ............................ 264/328.18 |
| 2117756 | 7/1972 | France . |
| 2124315 | 9/1972 | France . |
| 2546808 | 5/1984 | France . |
| 3441906 | 5/1986 | Germany . |
| 60-141524 | 7/1985 | Japan . |
| 1052773 | 9/1964 | United Kingdom . |

OTHER PUBLICATIONS

"Kneader Moulded Compound (KMC)—BMC mit verbesserten Eigenschaften", vol. 78, No. 3, Mar. 1988, Munchen, De, pp. 227–230.

Primary Examiner—Richard L. Chiesa
Attorney, Agent, or Firm—Birch, Stewart, Kolasch & Birch

[57] ABSTRACT

A method for producing a molded article of a fiber-reinforced thermoplastic resin, which includes supplying a melt mass of a thermoplastic resin which is reinforced with fibers dispersed therein and having an average fiber length of not shorter than 1 mm and not longer than 50 mm as a reinforcing material in an unclosed mold in which a film or sheet made of a thermoplastic resin having adhesiveness to a thermoplastic resin is optionally placed, closing the mold and pressurizing and cooling it to obtain a molded article.

4 Claims, 4 Drawing Sheets

METHOD FOR PRODUCING MOLDED ARTICLE OF FIBER-REINFORCED THERMOPLASTIC RESIN

This application is a continuation of application Ser. No. 07/684,912, filed on Apr. 19, 1991, now U.S. Pat. No. 5,275,776 the entire contents of which are hereby incorporated by reference.

BACKGROUND OF THE INVENTION

1. Field of the Invention

The present Invention relates to a method for producing a molded article of a fiber-reinforced thermoplastic resin which is used in industrial materials including automobile parts such as exterior panels, structural parts and battery trays, and building materials such as access floors. More particularly, the present invention relates to a method for producing a molded article of a fiber-reinforced thermoplastic resin which Is much less deformed due to orientation of the fibers and good in exterior gloss, dimensional stability and mechanical properties.

2. Description of the Related Art

Hitherto, some methods for producing a fiber-reinforced thermoplastic resin article have been proposed and industrially employed. One of the typical methods comprises molding the fiber-reinforced thermoplastic resin article from resin pellets which are reinforced with short-length fibers in a conventional molding manner such as injection molding. Another method uses thermoplastic resin pellets which are reinforced with middle-length fibers having substantially the same length as the pellets and produces the fiber-reinforced molded article by, for example, injection molding.

However, each of the above techniques has its own technical and economical problems.

In the method using the resin pellet reinforced with the short-length fibers which is most commonly employed, improvement of the mechanical strength which is the most important object of the fiber reinforcing, particularly impact resistance is not sufficient, although moldability, design flexibility and the production cost of this technique are superior to other techniques. The reason for the insufficient increase of the mechanical strength is that the fibers are severely broken during two plasticizing and kneading steps, namely the step for mixing and dispersing the fibers and the resins (the granulating step), and the molding step. In addition, since the fibers flow in the mold together with the resin melt in the molding step, the orientation of the fibers remains in the molded article and causes large deformation of the molded article. When the fibers, in particular, the inorganic fibers are used, they will wear screws and cylinders of extruders and an injection molding machine which are used for granulation and molding. Such wearing of the apparatus is a big problem in view of the production cost of the molded article.

The method using the resin pellets reinforced with the middle-length fibers requires a specially designed extruder head, and the productivity is inferior to the method using the pellets reinforced with the short-length fibers. Therefore, the production cost increases. In addition, as in the case of the short-length fibers, the molded article tends to deform, and the screws and cylinders of the extruder and the injection molding machine are worn.

In addition to the above drawbacks, the molded article of the fiber-reinforced thermoplastic resin has a poorer appearance and gloss than a molded article of non-reinforced thermoplastic resin, since the fibers are exposed on the surface in the former.

SUMMARY OF THE INVENTION

As described above, since the conventional methods have respective drawbacks in mechanical properties, deformation, appearance or cost, they are not satisfactory as technical methods. The present inventors have undertaken extensive study to develop a method which can overcome the above draw-backs, and have now completed a novel method for producing a molded article of a fiber-reinforced thermoplastic resin at a low cost, which method is industrially excellent.

According to a first aspect of the present invention, there is provided (i) a method for producing a molded article of a fiber-reinforced thermoplastic resin, which comprises supplying a melt mass of a thermoplastic resin (A) which is reinforced with fibers dispersed therein and having an average fiber length of not shorter than 1 mm and not longer than 50 mm as a reinforcing material in an unclosed mold, closing the mold and pressurizing and cooling it to obtain a molded article. According to a second aspect of the present invention, there is provided (ii) a method for producing a molded article of fiber-reinforced thermoplastic resin, which comprises placing a film or sheet made of a thermoplastic resin (B) having adhesiveness to a thermoplastic resin (A) in an unclosed mold, supplying a melt mass of a thermoplastic resin (A) which is reinforced with fibers dispersed therein and having an average fiber length of not shorter than 1 mm and not longer than 50 mm as a reinforcing material in the mold, closing the mold during or after the supply of the thermoplastic resin (A) and pressurizing and cooling the resin to obtain a molded article.

BRIEF DESCRIPTION OF THE DRAWINGS

FIGS. 1A, 1B, 2A, 2B, 3A, 3B, 4A and 4B show vertical cross sections of apparatuses used in the method of the present invention, wherein FIGS. 1A and 1B show a cross-sectional view of a first mold before and after molding, respectively;

FIGS. 2A and 2B show a cross-sectional view of a second mold before and after molding, respectively;

FIGS. 3A and 3B show a cross-sectional view of the first mold with a film or sheet before and after molding, respectively;

FIGS. 4A and 4B show a cross-sectional view of the second mold with a film or sheet before and after molding, respectively;

DETAILED DESCRIPTION OF THE PREFERRED EMBODIMENTS

The molding methods of the present invention will be explained by reference to the accompanying drawings.

Figure 1A:
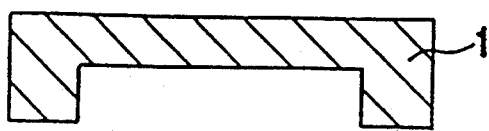
Figure 1B:
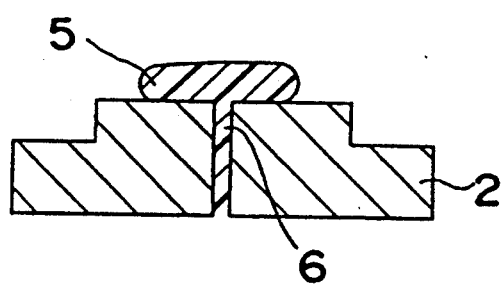
Figure 1B:
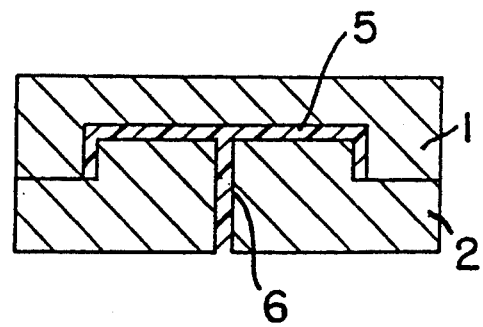
Figure 2A:
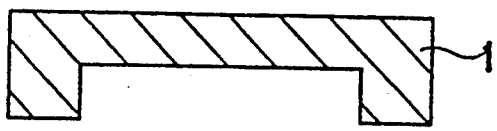
Figure 2B:
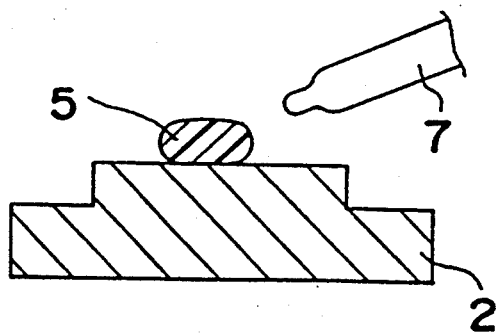
Figure 2B:
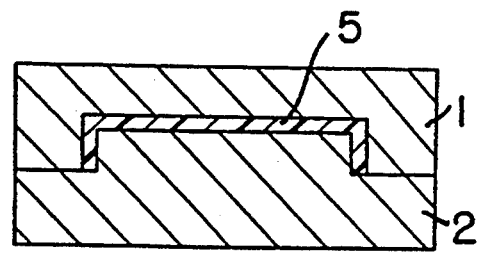

In the first embodiment, as shown in FIGS. 1 and 2, a melt mass of a fiber-reinforced thermoplastic resin 5 is supplied in an unclosed mold, having an upper mold half 1 and a lower mold half 2 whereby the mold is closed, pressurized and cooled to effect molding.

Figure 3A:
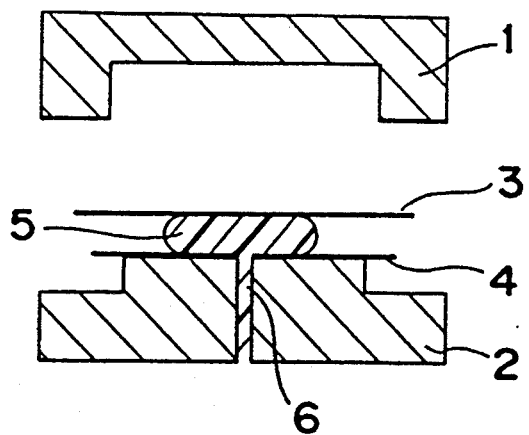
Figure 3B:
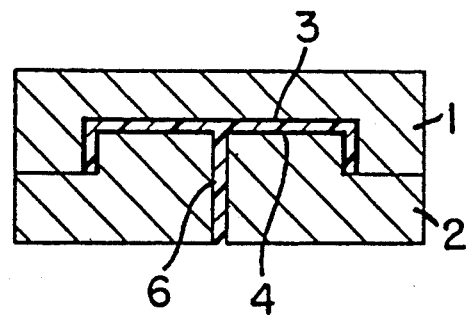
Figure 4A:
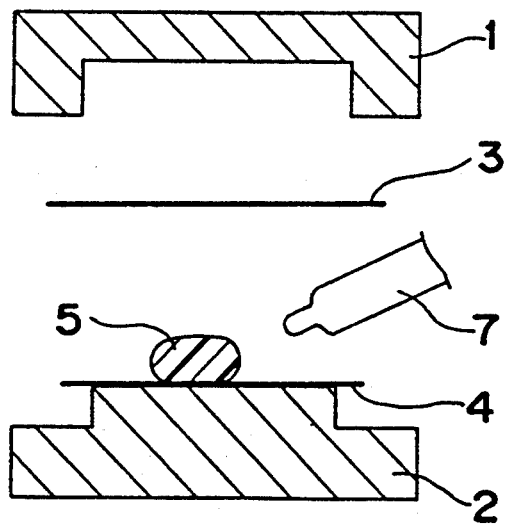
Figure 4B:
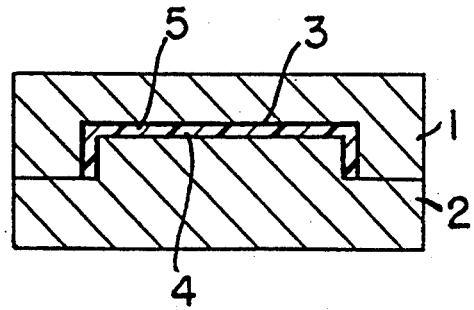

In the embodiment shown in FIGS. 3 and 4, a pair of films or sheets 3, 4 made of a thermoplastic resin (B) are placed in the unclosed mold, and the mold is closed during or after supplying a fiber-reinforced thermoplastic resin comprising a thermoplastic resin (A) as a matrix material, and then the mold is pressurized and cooled to effect molding.

In FIGS. 1 and 3, the resin melt 5 is supplied through a feed opening 6 provided in the wall of the lower mold 2 from independent resin supplying means (not shown). In FIGS. 2 and 4, the resin melt 5 is supplied from outside of the mold using a resin supplier such as a portable extruder 7 when the upper and lower molds 1 and 2 are still open.

In the present invention, the resin melt containing fibers having a length of 1 to 50 mm which are dispersed therein is supplied in an unclosed mold and then molded by a mold clamping pressure. Therefore, a pressure for supplying the resin melt to the mold is very low and from 100 to 300 kg/cm$^2$ which is much lower than a pressure of 500 to 1600 kg/cm$^2$ employed in injection molding, and the mold clamping pressure is extremely low and from 30 to 150 kg/cm$^2$. Accordingly, the fibers dispersed in the molten matrix resin are much less broken than in the injection molding.

The molded article produced by the present molding method has a substantially increased impact strength, and any part of the molded article is reinforced with long fibers.

When the film or sheet made of the thermoplastic resin (B) which has adhesiveness to the thermoplastic resin (A) is used as the outer layer in combination with the fiber-reinforced thermoplastic resin, it is possible to produce a product which is highly rigid and less deformed and has a beautiful appearance of resin surfaces.

Figure 5:
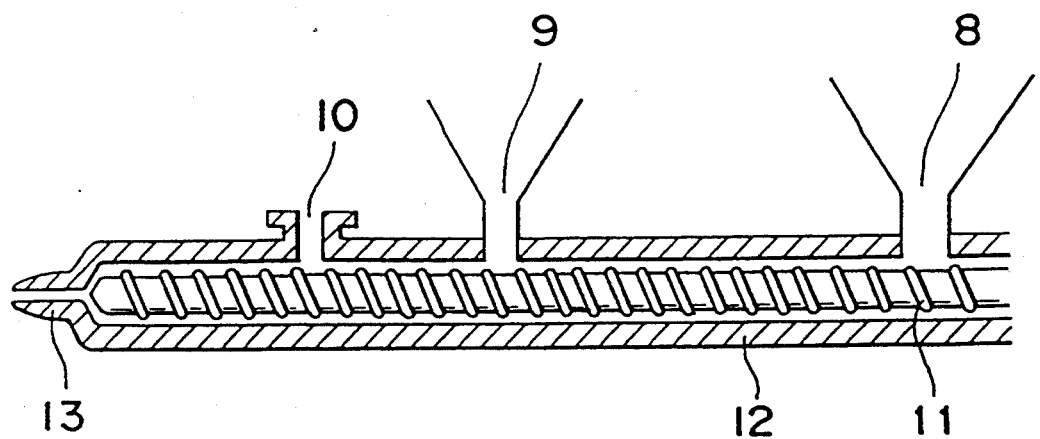
FIG. 5 shows a cross sectional view of a plasticator for kneading a matrix resin and fibers.

In the present invention, shear should be as small as possible to prevent breakage of the fibers in the plasticizing step. To this end, for example, a plasticator as shown in FIG. 5 can be preferably used. FIG. 5 shows a cross section of a plasticator 23 used in FIG. 7, which mixes the thermoplastic resin and reinforcing fibers. The plasticator comprises a heating cylinder 12 for melting the resin, a screw 11 for kneading the resin and a nozzle 3 from which the kneaded resin is supplied to an accumulator 24. In FIG. 5, numeral 8 indicates a feed opening for supplying a thermoplastic resin raw material, element 9 refers to a feed opening for supplying a fiber material, and element 10 is an exhaust vent for removing gasses contained in the resin.

In the plasticizing step of the fiber-reinforced thermoplastic resin, the fibers are broken mainly in a first half of the plasticator, namely in a resin pellet supplying part 8 and a compression part within the cylinder 12. In the plasticator to be used in the present invention, the feed opening 9 for supplying the fibers is provided in the cylinder 12 downstream of the compression part, namely at a part after the thermoplastic resin is molten. Air which is entrained in the molten resin together with the supplied fibers can be effectively removed through an exhaust vent 10 provided between the feed opening for the fibers and a cylinder nozzle 13. Since the supplied fibers should be homogeneously dispersed in the resin melt, a kneading part having a length as long as possible is provided after the fibers are introduced into the resin. To this end, a ratio of screw length to screw diameter is preferably at least 15 in the present invention. By using such an apparatus, it is possible to obtain a resin containing the homogeneously dispersed fibers which are long and very seldom broken. Further, by using the above methods in which the molding is carried out using the unclosed mold, the fibers are very rarely broken, so that the molded article is uniformly reinforced by the long fibers.

Figure 6:
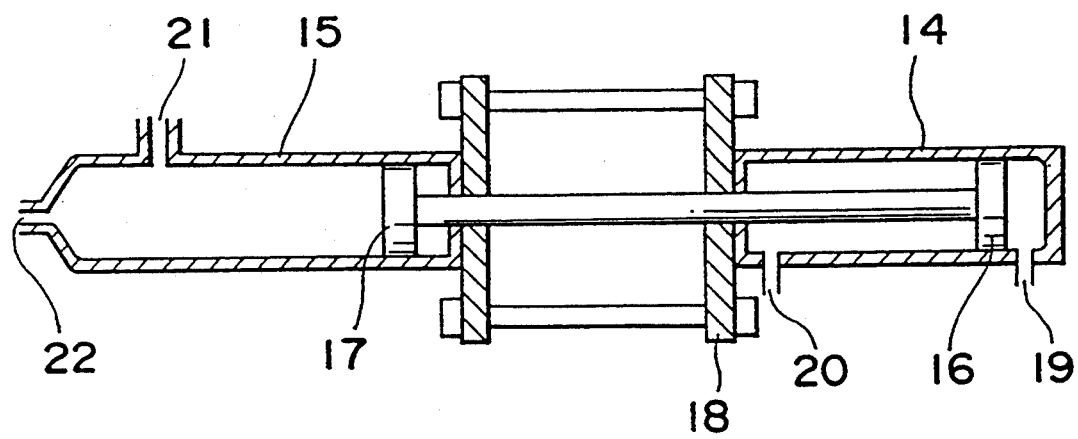
FIG. 6 shows an accumulator used in Examples of the present invention.
Figure 7:
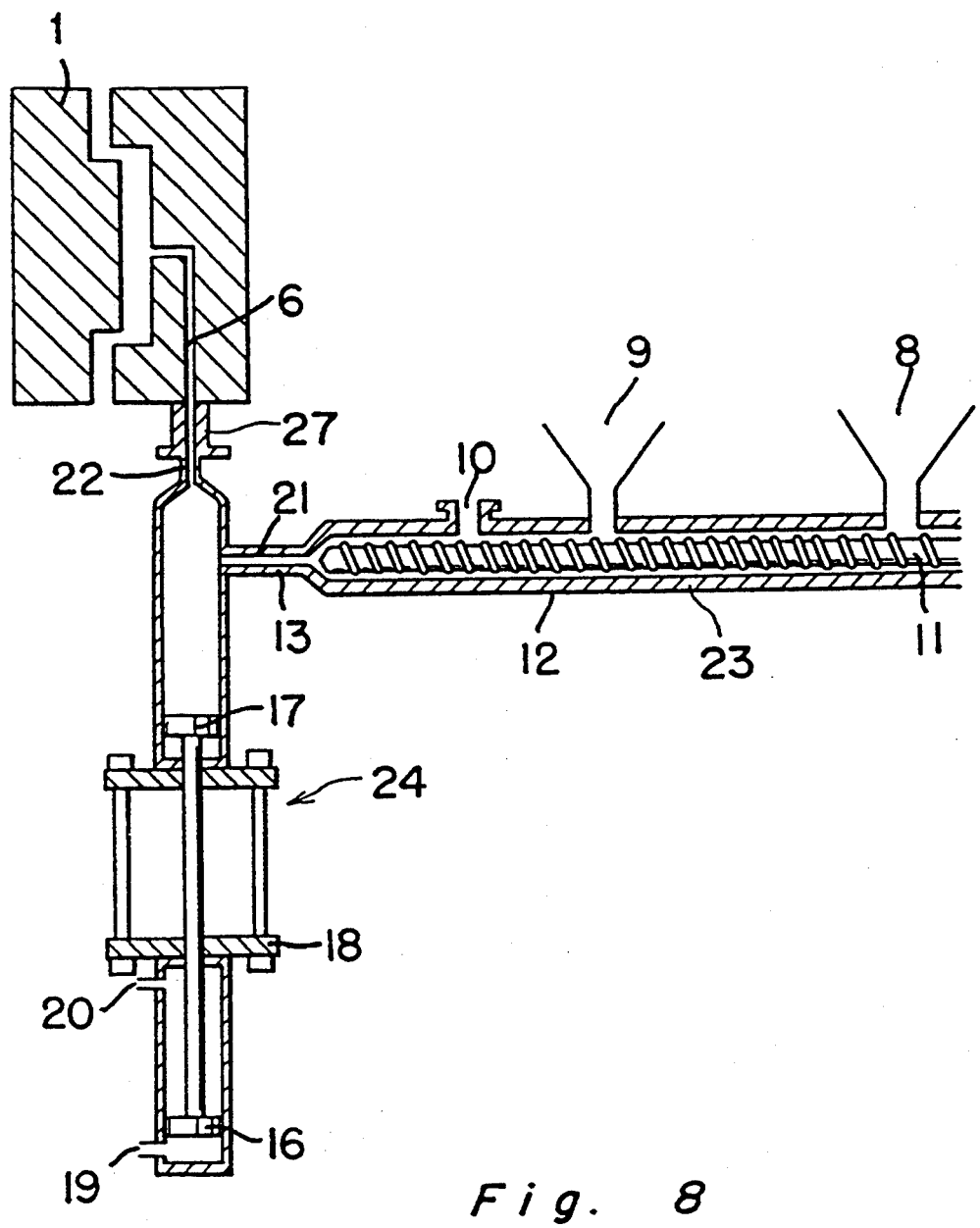
FIG. 7 shows a connection of the plasticator, the accumulator and the mold used in Examples of the present invention.

FIG. 6 shows a cross section of a accumulator 24 which supplies the fiber-reinforced resin melt to the mold. The accumulator 24 comprises a cylinder 15 for the molten resin and a hydraulic cylinder 14 for pressurizing the resin melt. The cylinder 15 has a feed opening 21 for receiving the resin melt from the nozzle 13 of the plasticator 23 and a cylinder nozzle 22 for supplying the fiber-reinforced resin melt to the molds. As shown in FIG. 7, the nozzle 22 is connected with the feed opening 6 through a manifold 27.

FIG. 7 shows the apparatus for carrying out the method of the present invention. The apparatus has the molds 1, 2, the accumulator 24 and the plasticator 23 which are connected as shown. The method of the present invention using this apparatus will be explained.

From the feed opening 8 of the plasticator 23, the resin is supplied and molten with the heating cylinder 12. The molten resin is forwarded in the cylinder towards the nozzle 13 by the rotation of the screw 11. During this, the fibers are supplied from the feed opening 9 for supplying the fibers, and the molten resin and the fibers are mixed. The fiber-reinforced resin melt is supplied in the cylinder 15 of the accumulator 24 through the nozzle 13 and the feed opening 21 and pressurized by the piston 17 which is connected with the piston 16 set in the hydraulic cylinder 14. Thereby, the resin melt is supplied in the molds through the cylinder nozzle 22 and the feed opening 6.

The thermoplastic resin films or sheets 3, 4 may be beforehand set between the molds 1, 2 to form the skin layers on the molded article.

After the supply of the resin melt, the feed opening 6 is closed and then the molds are closed to press mold the resin, followed by cooling to complete the molding.

After cooling, the molds are opened and the fiber-reinforced resin article is removed from the molds.

As the reinforcing fiber to be used in the present invention, there are used inorganic fibers such as glass fiber, carbon fiber, stainless steel fiber, etc.; organic fibers such as polyamide fiber, polyester fiber, aramid fiber, etc.; and mixtures thereof. When the glass fibers are used, they may be surface treated with a usual organic silicon compound such as aminosilane, vinyl silane and the like. A usual fiber having a diameter of 1 to 50 $\mu$m can be used.

In the present invention, as the fibers supplied from the feed opening 9 for supplying the fibers which is provided in the center part of the cylinder 12 of the plasticator, monofilament fiber having a fiber length of 1 to 50 mm, or collected fiber comprising several ten to several hundred monofilaments collected with a bundling agent may be used. When the fiber length is shorter than 1 mm, the mechanical strength, in particular, impact strength of the molded article is not sufficiently improved, while when the fiber length is longer than 50 mm, the fibers tends to bridge at an entrance of the feed opening for supplying the fibers so that the fibers are not smoothly supplied.

As the thermoplastic resin (A) to be used in the present invention, there are used thermoplastic resins such as polyethylene, polypropylene, polystyrene, an acrylonitrile-butadiene-styrene copolymer, polyvinyl chloride, polyamide, polycarbonate, polyethylene terephthalate, polybutylene terephthalate, polyphenylene ether, a styrene-acrylonitrile copolymer, and mixtures and polymer alloys thereof. In addition, there may be used a thermoplastic resin composition comprising the above thermoplastic resin and an inorganic filler such as talc, wollustonite or glass fibers so as to achieve a mold shrinkage factor of 10/1000 or less and a flexural modulus of 24,000 kg/cm$^2$ or larger. The thermoplastic resin may further contain a conventional additive such as a heat stabilizer and a UV light absorber, a colorant and an elastomer.

The sheet or film 3, 4 of the thermoplastic resin (B) to be used in the present invention is formed from a thermoplastic resins such as polyethylene, polypropylene, polystyrene, an acrylonitrile-butadiene-styrene copolymer, polyvinyl chloride, polyamide, polycarbonate, polyester, polyethylene terephthalate, polybutylene terephthalate, polyphenylene ether, and mixtures and polymer alloys thereof.

EXAMPLES

The present invention will be illustrated by the following Examples which do not limit the scope of the present invention. The test methods used in the Examples are as follows:

Flexural test

Figure 8:
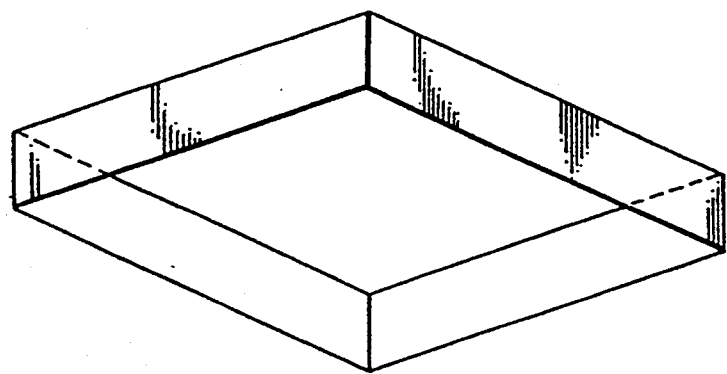
FIG. 8 is a perspective view of a box-shaped molded article produced in one embodiment of the present invention.

A three-point bending test according to JIS K 6758. Test pieces are cut out from a bottom plate of a box-shaped molded article of FIG. 8 and have a thickness of 2 mm, a width of 10 mm and a length of 90 mm. The test is carried out at 23° C.

Impact test (notched Izod impact test)

According to JIS K 6758, a notched Izod impact test is carried out. Test pieces are cut out from a bottom plate of a box-shaped molded article of FIG. 8 and have a thickness of 2 mm, a width of 10 mm and a length of 90 mm. This test is carried out at 23° C.

Average fiber length

A molded article is placed on an iron plate and heated with a burner for about one hour. Then, the article is kept in an electric furnace at 500° C. for 2 hours to remove combustible components. After cooling, fibers are sampled from arbitrary parts and lengths of 200 fibers are measured and averaged to obtain an average fiber length.

Fiber content

From a molded article, a sample piece of 20 mm×20 mm is cut out, and its weight is measured before burning. Then, the combustible components are removed in the same manner as in the measurement of average fiber length and fibers are taken out. A weight of the fibers after burning is measured and a fiber content is calculated according to the following equation:

$$\text{Fiber content (\%)} = \frac{\text{Weight of sample after burning}}{\text{Weight of sample before burning}} \times 100$$

Example 1

A vertical press molding machine with a mold locking force of 100 tons was equipped with a mold having an opening for supplying a resin melt. The accumulator of FIG. 6 was connected to a manifold 27 of the mold and the plasticator of FIG. 5 was connected to the accumulator. The plasticator had a full-flighted screw 11 with a diameter of 50 mm and a ratio of screw length to screw diameter was 29. The plasticator had a feed opening 8 for supplying the matrix resin at a rear part of a cylinder, a feed-opening 9 for supplying the fibers at a center part, and an exhaust vent 10 between the feed opening 9 for supplying the fibers and the nozzle. A vacuum pump (not shown) was connected to the exhaust vent 10 and used for forced ventilation. FIG. 7 shows a connected state of the apparatuses. A mold was used which consisted of upper 1 and lower 2 parts and an in-mold opening 6 of 3 mm in diameter for supplying the resin melt at a center of the lower mold part 2 and was designed for molding a box-shaped article having a wall thickness of 2 mm, and sizes of 200 mm in length, 200 mm in width and 40 mm in height (see FIG. 8).

As the thermoplastic resin, a polypropylene resin Sumitomo Noblen AX 568 (manufactured by Sumitomo Chemical Co., Ltd. having a melt flow index of 65 g/10 minutes) was used and supplied through the feed opening 8 for supplying the matrix resin. As the fiber, Glass Fiber Roving PER 231-SM14 (manufactured by Nippon Glass Fiber Co., Ltd.) was supplied after cut to a length of 13 mm with a roving cutter through the feed opening 9 for supplying the fibers in an amount of 15% by weight based on the polypropylene weight.

A fiber content and an average fiber length were measured with samples which were cut out from a part around an accumulator nozzle and an end part of the molded article. As shown in the Table, the molded article contained the least broken fibers which were homogeneously dispersed therein. By carrying out a flexural test and an impact test, improvement of the mechanical strength by the fiber reinforcement was confirmed.

Example 2

Under the same conditions as in Example 1 but using the polypropylene resin (Sumitomo Noblen AX 568) containing 10% by weight of a maleic acid-modified polypropylene resin and glass fibers surfaces of which were treated with vinyl silane, the molding test was done. As shown in the Table, the molded article had good mechanical strength.

Example 3

Under the same conditions as in Example 2 but cutting the supplied fibers to a length of 25 mm, the molding test was done. As shown in the Table, the molded article had good mechanical strength.

Example 4

A molding test was done using a vertical press molding machine with a mold locking force of 200 tons. A mold consisted of upper and lower parts and had an in-mold opening of 2 mm in diameter for supplying the resin melt at the center of the lower part, which opening was connected to a manifold. The mold was designed for molding a box-shaped article having a wall thickness of 2.0 mm, and sizes of 200 mm in length, 200 mm in width and 40 mm in height (see FIG. 8).

First, in the mold, were placed a pair of extruded sheets FLEXLOY (trademark) D-2000 made of PP/EPDM/Nylon 6 and each having a thickness of 300 μm and a hole of 10 mm in diameter at a part corresponding to the resin supplying opening of the mold.

By using a plasticator which had a full-flighted screw with a diameter of 50 mm and a ratio of screw length to screw diameter of 29 and comprised a feed opening for supplying the matrix resin at a rear part of a cylinder, a feed opening for supplying the fibers at a center part and an exhaust vent between the feed opening for supplying the fibers and the nozzle, a polypropylene resin Sumitomo Noblen AX 568 having a melt flow index of 65 g/10 minutes was supplied through the feed opening for supplying the matrix resin and, as the fiber, Glass Fiber Roving PER 231-SM14 was supplied after being cut to a length of 13 mm with the roving cutter through the feed opening for supplying the fibers in an amount of 30% by weight based on the polypropylene weight. The obtained long fiber-dispersed resin melt was filled in the accumulator and then supplied between the already placed thermoplastic resin sheets through the resin-supplying opening in the mold and the hole in the sheet. Then, the mold was closed to effect molding. As shown in the Table, the molded article had good appearance and mechanical strength.

Comparative Example 1

Under the same conditions as in Example 1 but using a 1:1 blend of a polypropylene resin filled with 30% by weight of glass fibers (Sumitomo Noblen GHH 43 manufactured by Sumitomo Chemical Co., Ltd., average glass fiber length of 0.7 mm) and a polypropylene resin containing no glass fiber (Sumitomo Noblen Y 101 manufactured by Sumitomo Chemical Co., Ltd.) and supplying no glass fibers through the feed opening for supplying the fibers, the molding test was done. As shown in the Table, the produced article had insufficient impact strength.

Comparative Example 2

Under the same conditions as in Example 1 but supplying the glass fibers through the feed opening 8 for supplying the matrix resin, the molding test was done. As shown in the Table, the produced article had insufficiently improved impact strength.

Comparative Example 3

Under the same conditions as in Example 1 but using a plasticator having a full-flighted screw with a diameter of 50 mm and a ratio of screw length to screw diameter of 10, the molding test was done. The produced article contained bubbles therein and the fibers were insufficiently split and localized.

Comparative Example 4

An article was molded using no sheet of thermoplastic resin (FLEXLOY (trademark) D-2000 a mixture of polypropylene, Nylon 6 and EPDM). Other conditions were the same as in Example 4, and the test was done. The surface property of the molded article was inferior to that of Example 4.

TABLE

| Example No. | Matrix resin | | Glass fiber | | Residual av. fiber length | | Glass fiber content (%) | | Flexural modulus (kg/cm$^2$) | Notched Izod impact strength (kg · cm/cm) |
|---|---|---|---|---|---|---|---|---|---|---|
| | Unmodified-polypropylene | Modified polypropylene | Cut length when supplied (mm) | Surface treatment | Accumulator nozzle part (mm) | Article end (mm) | at resin supply opening | at article end | | |
| 1 | AX 568 100% | — | 13 | No | 7.0 | 5.8 | 15.3 | 15.0 | 33,000 | 16 |
| 2 | AX 568 90% | Maleic acid modified PP (10%) | 13 | with silane | 7.1 | 6.1 | 15.2 | 14.9 | 34,000 | 22 |
| 3 | ↑ | ↑ | 25 | ↑ | 8.5 | 6.2 | 15.1 | 15.2 | 35,000 | 25 |
| 4 | AX 568 100% | — | 13 | No | 7.0 | 6.0 | 30.2 | 29.9 | 50,000 | 30 |
| Com. 1 | GHH 43 50% Y 101 50% | — | 17 | with silane | 0.4 | 0.4 | 14.3 | 14.6 | 33,000 | 5 |
| Com. 2 | AX 568 100% | — | 13 | No | 1.2 | 0.7 | 15.1 | 15.2 | 33,000 | 6 |

Note: 1) The glass fibers were supplied through the feed opening for supplying the matrix resin.

EFFECTS OF THE INVENTION

By using the fiber-reinforced molding technique of the present invention, the article is reinforced with the long fibers simultaneously with the molding, and the article which is uniformly reinforced to its ends can be produced at a low cost. Further, by using, as the outer layer, the film or sheet made of the thermoplastic resin (B) having adhesiveness to the thermoplastic resin (A) in combination with the fiber-reinforced thermoplastic resin, it is possible to produce a product which is rigid and less deformed and has a beautiful resinous surface appearance.

What is claimed is:

1. A method for producing a molded article of a fiber-reinforced thermoplastic resin, which comprises the steps of:
   (a) feeding a raw thermoplastic resin material into a first feed opening of a plasticator which has a ratio of screw length to screw diameter of at least 15 and comprises a second feed opening for supplying fibers at a center of a cylinder and an exhaust vent on a nozzle side;
   (b) heating said raw thermoplastic resin material fed in step (a) in said plasticator until said raw thermoplastic resin material is molten;
   (c) introducing fibers in said second feed opening of said plasticator downstream of said step (a);
   (d) removing entrained air from the mixture of said thermoplastic resin and said fibers downstream of said second feed opening;
   (e) uniformly kneading said fibers in said molten resin;
   (f) extruding said molten thermoplastic resin containing dispersed fibers having an average length of from 1 mm to 50 mm as a reinforcing material into an accumulator;

(g) supplying said molten fiber-reinforced thermoplastic resin from said accumulator in an unclosed mold;

(h) closing said mold during or after the supply of said molten fiber-reinforced thermoplastic resin; and (i) pressurizing and cooling said fiber-reinforced thermoplastic resin in said mold and removing a molded article from said mold.

2. The method according to claim 1, wherein the fiber reinforced thermoplastic resin has a mold shrinkage factor of 10/1000 or less and a flexural modulus of 24,000 kg/cm$^2$ or larger.

3. The method according to claim 1, wherein a pressure for supplying the resin melt is from 100 to 300 kg/cm$^2$.

4. The method according to claim 1, wherein a mold clamping pressure is from 30 to 150 kg/cm$^2$.

* * * * *